US011959404B2

(12) United States Patent
Gutmann et al.

(10) Patent No.: US 11,959,404 B2
(45) Date of Patent: Apr. 16, 2024

(54) LAYER SINTERED VALVE SEAT RING, PROCESS FOR ITS PRODUCTION, COMBINATIONS THEREWITH AND THEIR USE

(71) Applicant: Mahle International GmbH, Stuttgart (DE)

(72) Inventors: Andreas Gutmann, Zell im Wiesental (DE); Marco Ortlieb, Schoenberg (DE); Patrick Sutter, Schopfheim (DE); Klaus Wintrich, Schopfheim (DE)

(73) Assignee: Mahle International GmbH (DE)

(*) Notice: Subject to any disclaimer, the term of this patent is extended or adjusted under 35 U.S.C. 154(b) by 0 days.

(21) Appl. No.: 17/945,973

(22) Filed: Sep. 15, 2022

(65) Prior Publication Data

US 2023/0084759 A1 Mar. 16, 2023

(30) Foreign Application Priority Data

Sep. 16, 2021 (DE) ......................... 102021210268.9

(51) Int. Cl.
*F02B 75/00* (2006.01)
*F01L 3/02* (2006.01)
*F02F 1/24* (2006.01)

(52) U.S. Cl.
CPC ................. *F01L 3/02* (2013.01); *F02F 1/24* (2013.01); *F01L 2301/00* (2020.05); *F02F 2200/06* (2013.01)

(58) Field of Classification Search
CPC .. B22F 5/008; B22F 2998/10; C22C 33/0285; F01L 2303/00; F01L 2301/00; F01L 3/02; F16K 25/005
(Continued)

(56) References Cited

U.S. PATENT DOCUMENTS 7,089,902 B2 * 8/2006 Sato ........................ B22F 5/008 123/188.8
9,719,157 B2 8/2017 Jung
(Continued)

FOREIGN PATENT DOCUMENTS

CN 1324957 A 12/2001
CN 102994917 A 3/2013
(Continued)

OTHER PUBLICATIONS

English abstract for JP-2015127520.
(Continued)

*Primary Examiner* — Long T Tran
*Assistant Examiner* — James J Kim
(74) *Attorney, Agent, or Firm* — Fishman Stewart PLLC

(57) ABSTRACT

A layer-sintered valve seat ring is disclosed. The layer-sintered valve seat ring includes at least two materials including a function material for a tribological contact with an opposite runner and a support material for the function material. The support material includes: C: 0.5 to 1.8% by weight; Cr: 3 to 16% by weight; Mo: 1 to 5% by weight; W: 0.5 to 5.5% by weight; V: 0.4 to 4.0% by weight; Cu: 12 to 25% by weight; Fe: 41.3 to 82.6% by weight; Mn: up to 0.6% by weight; Si: up to 1.8% by weight; and a remainder of production-related contamination in the form of at least one of Ni, Co, Ca, P, and S that are present in contents of <0.3% by weight each.

20 Claims, 1 Drawing Sheet

(58) Field of Classification Search
USPC .......................................................... 123/77
See application file for complete search history.

(56) References Cited

U.S. PATENT DOCUMENTS

| | | | | |
|---|---|---|---|---|
| 10,584,618 | B2 * | 3/2020 | Hashimoto | C22C 38/28 |
| 11,311,936 | B2 | 4/2022 | Kohler | |
| 2016/0375494 | A1 * | 12/2016 | Beerens | B22F 9/082<br>251/368 |
| 2019/0143415 | A1 * | 5/2019 | Kohler | F16K 25/005<br>251/368 |
| 2021/0215071 | A1 * | 7/2021 | Oikawa | C22C 1/1094 |
| 2022/0097134 | A1 | 3/2022 | Grueneberg | |

FOREIGN PATENT DOCUMENTS

| | | | |
|---|---|---|---|
| CN | 103480849 | A | 1/2014 |
| CN | 104895695 | A | 9/2015 |
| CN | 104937121 | A | 9/2015 |
| CN | 107794459 | A | 3/2018 |
| CN | 110819883 | A | 2/2020 |
| CN | 112522606 | A | 3/2021 |
| CN | 112593163 | A | 4/2021 |
| DE | 19942780 | A1 | 3/2001 |
| DE | 102016109539 | A1 | 12/2017 |
| DE | 102020212371 | A1 | 3/2022 |
| JP | 2015127520 | A | 7/2015 |
| WO | 2006034727 | A1 | 4/2006 |

OTHER PUBLICATIONS

English abstract for DE-19942780.
German Search Report for DE-10 2021 210 268.9, dated May 18, 2022.
Chinese First Office Action dated Oct. 26, 2023 and Chinese Search Report dated Oct. 19, 2023 for Chinese Patent Application No. 202211123616.9.
Shengyan Ye, "Motorcycle Engine Design", Posts & Telecom Press, Jul. 31, 1997.
Guisheng Yao, "Automotive Metal Material Application Handbook (vol. I)—Requirement, Performance, and Selection of Automotive Steel", Beijing Institute of Technology Press , May 31, 2000.
Dade Liu et al., Structure, Principle, and Maintenance of Dongfeng 4B Internal Combustion Locomotive, China Railway Publishing House, May 31, 1998.
Fenglin Han, Practical Manual of Powder Metallurgy Parts: Automobile and Motorcycle Parts, Ordnance Industry Press, Jan. 31, 1996.

* cited by examiner

LAYER SINTERED VALVE SEAT RING, PROCESS FOR ITS PRODUCTION, COMBINATIONS THEREWITH AND THEIR USE

CROSS-REFERENCE TO RELATED APPLICATION

This application claims priority to German Application No. DE 10 2021 210 268.9 filed on Sep. 16, 2021, the contents of which are hereby incorporated by reference in its entirety.

TECHNICAL FIELD

The present invention relates to a layer-sintered valve seat ring. The present invention additionally relates to a method for its production, combinations therewith and their use.

BACKGROUND

The use of layer-sintered valve seat rings having a support material and a function material is known. There, an expensive function material is usually combined with a cost-effective support material and by way of this the material costs for a valve seat ring are lowered. The boundary surface between the support material and the function material can, based on the axis of the valve seat ring (in the axial direction of the same), be arranged either orthogonally or at a special angle, non-orthogonally.

The installation of valve seat rings in the cylinder head generally takes place as a press fit, i.e. there is an overlap between the valve seat ring outer diameter and the diameter of the receiving bore in the cylinder head which usually amounts to 40 μm to 120 μm.

While the use of layer-sintered valve seat rings combined with a cylinder head made of an aluminium alloy is unproblematic, problems with the relaxation of the valve seat rings can occur when using cylinder heads made of cast iron alloys (for example made of cast iron with lamellar graphite (GJL), cast iron with vermicular graphite (GJV) or cast iron with spheroidal graphite (GJS)). The relaxation is a plastic deformation or a thermal creep of the valve seat ring material in the hot state (i.e. during the operation). Because of this, the outer diameter of the valve seat ring becomes smaller in the cooled-down state and the valve seat ring loses a part of its overlap/press fit in the receiving bore of the cylinder head. In the process, a loosening or detaching of the valve seat ring from the cylinder head and thus an engine failure can ultimately occur.

In particular, the use of layer-sintered valve seat rings can lead to a greater relaxation of the valve seat rings since the cheaper support material generally has a lower creep resistance than the function material and thus the overlap/press fit can be lost relatively quickly.

The object of the invention is to provide a layer-sintered valve seat ring which is to be used in cylinder heads of cast iron alloys, in the case of which the relaxation, compared with conventional layer-sintered valve seat rings, is reduced. Further, a method for its production, combinations therewith and a use of the combinations are to be provided.

According to the invention, this problem is solved through the subjects of the independent Claim(s). Advantageous embodiments are subject of the dependent claims.

SUMMARY

The present invention is based on the general idea of forming the support material in a layer-sintered valve seat ring so that its relaxation, compared with conventional layer-sintered valve seat rings, is reduced so far that a loosening or detaching of the layer-sintered valve seat ring from the cylinder head during the operation is prevented. In particular, a layer-sintered valve seat ring is designed so that it includes at least two materials, wherein one material is a function material for a tribological contact with an opposite runner and one material is a support material for the function material, wherein the support material contains: C: 0.5 to 1.8% by weight; Cr: 3 to 16% by weight; Mo: 1 to 5% by weight; W: 0.5 to 5.5% by weight; V: 0.4 to 4.0% by weight; Cu: 12 to 25% by weight; Fe: 41.3 to 82.6% by weight; if necessary, one or more of Mn: up to 0.6% by weight; Si: up to 1.8% by weight; wherein the rest are production-related contaminations in the form of Ni, Co, Ca, P and/or S, which likewise are present in contents of <0.3% by weight each where applicable.

In an advantageous further development of the solution according to the invention, the support material contains: C: 1.0 to 1.8% by weight; Cr: 10 to 15% by weight; Mo: 2.5 to 5% by weight; W: 0.8 to 1.5% by weight; Si: 0.2 to 1.8% by weight; V: 0.4 to 1.5% by weight; Cu: 12 to 25% by weight; Fe: 47.8 to 73.1% by weight; if necessary Mn: up to 0.6% by weight; wherein the rest are production-related contaminations in the form of Ni, Co, Ca, P and/or S, which likewise are present in contents of <0.3% by weight each where applicable.

In an advantageous further development of the solution according to the invention, the support material contains: C: 0.7 to 1.1% by weight; Cr: 3 to 5% by weight; Mo: 3 to 5% by weight; W: 3.5 to 5.5% by weight; V: 1.0 to 2.0% by weight; Cu: 15 to 25% by weight; Fe: 54.8 to 73.8% by weight; if necessary, one or more of Mn: up to 0.6% by weight; Si: up to 1.0% by weight; wherein the rest are production-related contaminations in the form of Ni, Co, Ca, P and/or S, which likewise are present in contents of <0.3% by weight each where applicable.

In an advantageous further development of the solution according to the invention, the support material contains: C: 1.0 to 1.8% by weight; Cr: 12 to 16% by weight; Mo: 1 to 2.5% by weight; W: 0.8 to 2.0% by weight; Si: 0.2 to 1.2% by weight; V: 0.4 to 1.5% by weight; Cu: 12 to 25% by weight; Fe: 49.4 to 72.6% by weight; if necessary Mn: up to 0.6% by weight; wherein the rest are production-related contaminations in the form of Ni, Co, Ca, P and/or S, which likewise are present in contents of <0.3% by weight each where applicable.

In an advantageous further development of the solution according to the invention, the support material contains: C: 0.7 to 1.5% by weight; Cr: 2 to 4% by weight; Mo: 12 to 18% by weight; W: 2 to 4% by weight; V: 1 to 2% by weight; Cu: 10 to 20% by weight; Co: 6 to 14% by weight; Fe: 34.5 to 66.3% by weight; if necessary Mn: up to 1.0% by weight; Si: up to 1% by weight; wherein the rest are production-related contaminations in the form of Ni, Co, Ca, P and/or S, which likewise are present in contents of <0.3% by weight each where applicable.

Further, the present invention provides a combination of a valve seat ring according to the invention and a valve, wherein the valve is hard-faced or nitrided.

Further, the present invention provides a combination of a valve seat ring according to the invention and a valve, wherein the valve is formed from a nickel-based alloy or an iron-based alloy with an Ni content of 10 to 40% by weight.

Further, the present invention provides a combination of a valve seat ring according to the invention and a cylinder head of a cast iron alloy, wherein the cast iron alloy contains lamellar graphite, vermicular graphite or spheroidal graphite, and wherein the valve seat ring is inserted into the cylinder head with a press fit.

Further, the present invention provides a method for producing a layer-sintered valve seat ring according to the invention, including the steps: producing starting material powders for a support material and a function material with compositions as stated above; uniaxial pressing of the starting material powder; sintering the uniaxially pressed starting material powders under an endogas atmosphere or a nitrogen-hydrogen atmosphere at a temperature in the range from 1055° C. to 1152° C.; and heat-treating of the sintered material by tempering or annealing.

In an advantageous further development of the method according to the invention, the uniaxial pressing is carried out at a pressure in the range from 40 MPa to 140 MPa at a temperature in the range from 12° C. to 60° C. and for a time in the range from 0.5 s to 1.8 s.

In an advantageous further development of the method according to the invention, the sintering is carried out for a time in the range from 10 min to 30 min at sintering temperature.

In an advantageous further development of the method according to the invention, the heat-treating is carried out by tempering, wherein the tempering is preferentially carried out by hardening at 850° C. to 950° C., oil-quenching and annealing at 510° C. to 610° C. in this order.

In an advantageous further development of the method according to the invention, the heat-treating is carried out by annealing, wherein the annealing is preferentially carried out by heating at 550° C. to 620° C.

In an advantageous further development of the method according to the invention, one of the combinations mentioned above is used in an internal combustion engine, which is partly or completely operated with hydrogen as fuel gas.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

The drawings show, in each case schematically.

DETAILED DESCRIPTION

Figure 1:
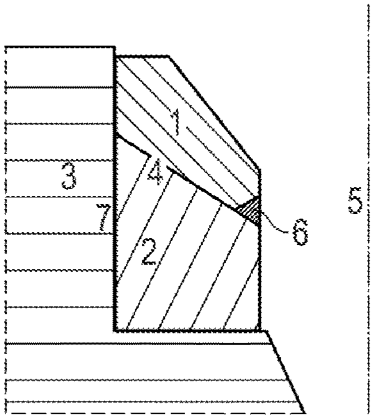
FIG. 1 a sectional representation through a valve seat ring according to the invention having a boundary surface between function material and support material running orthogonally to the valve seat ring axis, FIG. 2 a sectional representation through a valve seat ring according to the invention having a boundary surface between function material and support material running non-orthogonally to the valve seat ring axis, and FIG. 3 diagrams, which show the overlap between a valve seat ring material and a receiving bore in a cylinder head following engine tests.

According to FIG. 1, a valve seat ring according to the invention comprises a function material (1) and a support material (2) according to an embodiment. A boundary surface (4) running orthogonally to the valve seat ring axis (5) is present between the function material (1) and the support material (2). The angle (6) between the function material (1) and the support material (2) accordingly amounts to 90°. As shown in FIG. 1, the valve seat ring is fitted into a cylinder head (3) by means of a press fit, which is shown by the press fit boundary surface (7). The overlap of the press fit is usually in the range of 40 μm to 120 μm, preferentially in the range from 50 μm to 110 μm, in particular in the range from 70 μm to 100 μm.

Figure 2:
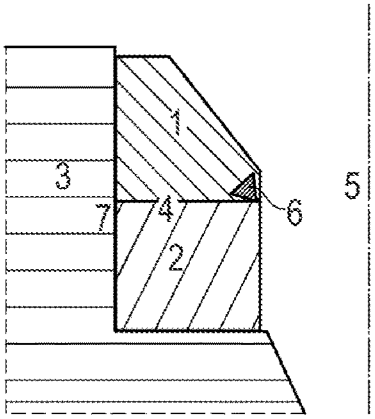

FIG. 2 shows a valve seat ring according to the invention according to a further embodiment. The valve seat ring according to FIG. 2 is substantially identical with the valve seat ring according to FIG. 1, with the exception that the boundary surface between the function material (1) and the support material (2) runs non-orthogonally to the valve seat ring axis (5). In particular, the angle (6) between the function material (1) and the support material (2) here is smaller than 90°, such as for example between 35° and 70°, preferentially between and 55°. This has the advantage that the contact surface of the support material (2) to the cylinder head (3) is enlarged and the required quantity of the expensive function material (1) can be reduced at the same time, which leads to a lowering of costs.

The valve seat ring according to the invention can be produced in particular with the following method.

In a first step, starting material powders for the support material 2 and the function material 1 are produced with compositions as stated above. This is followed by a uniaxial pressing of these starting material powders, preferentially at a pressure in the range from 40 MPa to 140 MPa, at a temperature in the range from 12° C. to 60° C. and for a time in the range from 0.5 s to 1.8 s. Here, one of the starting material powders, prior to the joint final compaction by uniaxial pressing can be subjected to a pre-compaction. By way of this, the boundary surface between the support material and the function material can be pre-adjusted to a desired angle with respect to the valve seat ring axis in the manner shown in FIGS. 1 and 2.

Following this, the uniaxially pressed starting material powder is sintered under an endogas atmosphere or a nitrogen-hydrogen atmosphere at a temperature in the range from 1055° C. to 1152° C., wherein the sintering is carried out preferentially for a time in the range from 10 min to 30 min.

Finally, the sintered material is heat-treated by tempering or annealing. The tempering is preferably carried out by hardening at 850° C. to 950° C., oil-quenching and annealing at 510° C. to 610° C. in this order. The annealing is preferably carried out by heating at 550° C. to 620° C.

The valve seat ring according to the invention is preferably used in a combination with a hard-faced or nitrided valve as opposite runner. Alternatively, the application as valve seat ring can take place combined with a valve of a nickel-based alloy or an iron-based material with an Ni content of 10-40% by weight as opposite runner.

EXAMPLES

In the following, examples of the present invention in the form of two fired engine tests are described. Here, the outer diameter each of the valve seat rings after the engine test was measured in three planes and the receiving bore in the cylinder head was likewise measured in three planes. From this the overlap of the respective valve seat ring in the planes was then calculated.

Engine Test 1

The engine test 1 was a high performance load cycle with a runtime of 1063 hours at a rated output of 260 kW (engine with 7.7 1 cubic capacity). This customer-specific cyclical continuous operation takes place with a high full-load proportion. The support material was a material according to the present claim 2 and the function material was a material according to the present claim 5. The angle (6) between the function material and the support material amounted to approximately 90°. The cylinder head material was cast iron with lamellar graphite (GJL). The initial overlap between valve seat ring and cylinder head amounted to 40 to 60 μm and the outer diameter of the valve seat ring amounted to 40.068±0.008 mm. The comparison material was the cast material PL 500. For comparing the material according to the invention with the comparison cast material, the mean value of 4 VSR exhaust valve seat rings each was formed.

Engine Test 2

The engine test 2 was a customer-specific "cold-warm-continuous operation" with a runtime of 264 hours (engine with 12.8 1 cubic capacity). The support material was a material according to the present claim 2 and the function material was a material according to the present claim 5. The angle (6) between the function material and support material amounted to 60 to 68°. The cylinder head material was cast iron with lamellar graphite (GJL). The initial overlap between valve seat ring and cylinder head amounted to 50 to 70 μm and the outer diameter of the valve seat ring amounted to 43.078±0.008 mm. The comparison material was the sinter material PLS 259. For comparing the material according to the invention with the comparison cast material, the mean value of 3 VSR exhaust valve seat rings each was formed.

Figure 3:
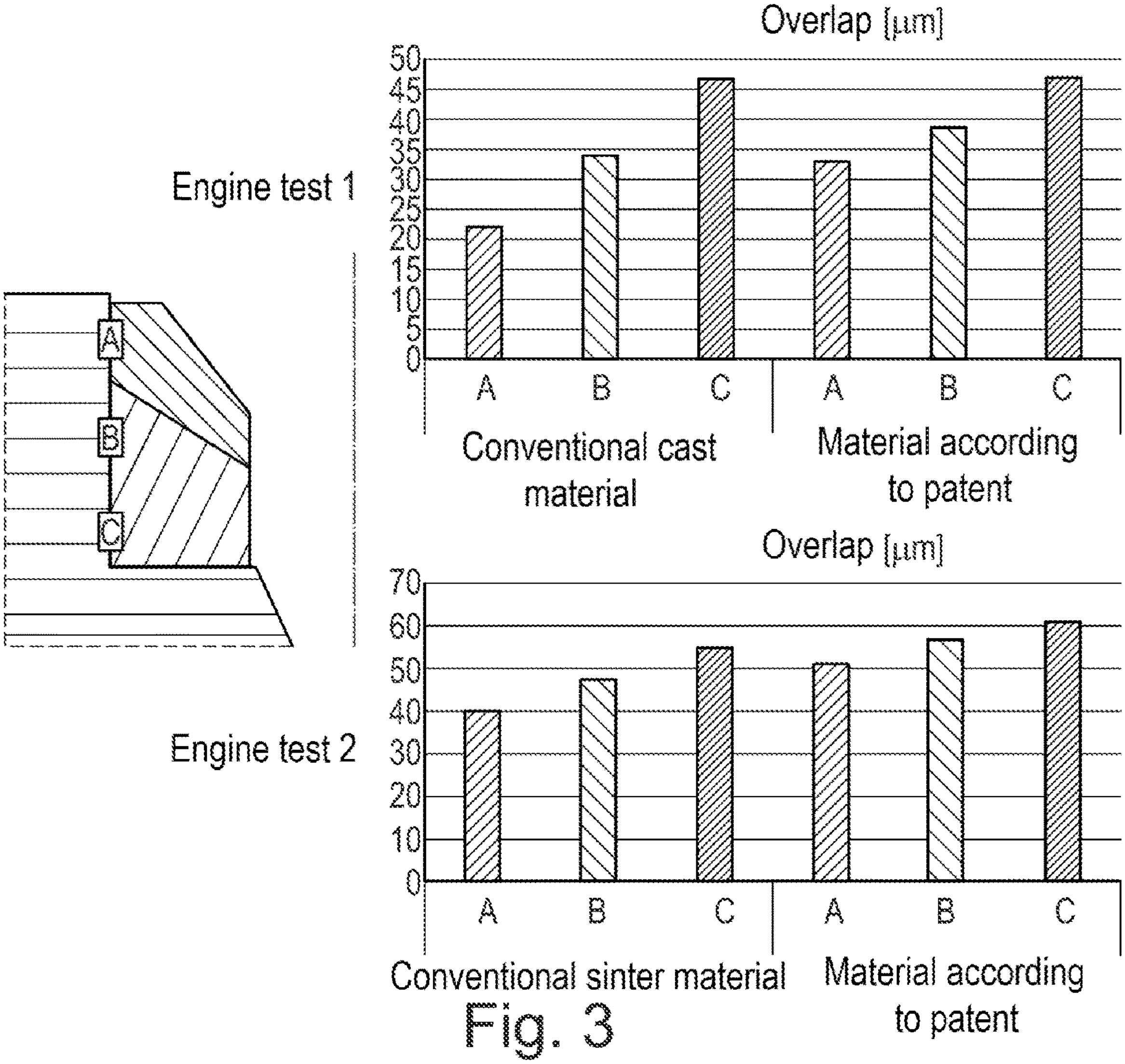

In FIG. 3, the respective overlap is shown in the regions A, B and C of the respective valve seat ring in comparison with a conventional casting material or in comparison with a conventional sinter material. FIG. 3 shows that the overlap after the tests with the material according to the invention is higher than with the respective comparison material.

The invention claimed is:

1. A layer-sintered valve seat ring, comprising:

at least two materials, wherein one material is a function material for a tribological contact with an opposite runner and another material is a support material for the function material, wherein the support material includes:

C: 0.5 to 1.8% by weight;

Cr: 3 to 16% by weight;

Mo: 1 to 5% by weight;

W: 0.5 to 5.5% by weight;

V: 0.4 to 4.0% by weight;

Cu: 12 to 25% by weight;

Fe: 41.3 to 82.6% by weight;

Mn: up to 0.6% by weight;

Si: up to 1.8% by weight;

wherein a remainder of the support material is production-related contaminations in the form of at least one of Ni, Co, Ca, P and S that are present in contents of <0.3% by weight each.

2. The layer-sintered valve seat ring according to claim 1, wherein the support material contains:

C: 1.0 to 1.8% by weight;

Cr: 10 to 15% by weight;

Mo: 2.5 to 5% by weight;

W: 0.8 to 1.5% by weight;

Si: 0.2 to 1.8% by weight;

V: 0.4 to 1.5% by weight;

Cu: 12 to 25% by weight;

Fe: 47.8 to 73.1% by weight;

Mn: up to 0.6% by weight; and wherein the remainder are production-related contaminations in the form of at least one of Ni, Co, Ca, P and S that are present in contents of <0.3% by weight each.

3. The layer-sintered valve seat ring according to claim 1, wherein the support material contains:

C: 0.7 to 1.1% by weight;

Cr: 3 to 5% by weight;

Mo: 3 to 5% by weight;

W: 3.5 to 5.5% by weight;

V: 1.0 to 2.0% by weight;

Cu: 15 to 25% by weight;

Fe: 54.8 to 73.8% by weight;

Mn: up to 0.6% by weight;

Si: up to 1.0% by weight;

wherein the remainder are production-related contaminations in the form of at least one of Ni, Co, Ca, P and S, which are present in contents of <0.3% by weight each where applicable.

4. The layer-sintered valve seat ring according to claim 1, wherein the support material contains:

C: 1.0 to 1.8% by weight;

Cr: 12 to 16% by weight;

Mo: 1 to 2.5% by weight;

W: 0.8 to 2.0% by weight;

Si: 0.2 to 1.2% by weight;

V: 0.4 to 1.5% by weight;

Cu: 12 to 25% by weight;

Fe: 49.4 to 72.6% by weight;

Mn: up to 0.6% by weight;

wherein the remainder are production-related contaminations in the form of at least one of Ni, Co, Ca, P and that are present in contents of <0.3% by weight each.

5. The layer-sintered valve seat ring according to claims 1, wherein the function material includes:

C: 0.7 to 1.5% by weight;

Cr: 2 to 4% by weight;

Mo: 12 to 18% by weight;

W: 2 to 4% by weight;

V: 1 to 2% by weight;

Cu: 10 to 20% by weight;

Co: 6 to 14% by weight;

Fe: 34.5 to 66.3% by weight;

Mn: up to 1.0% by weight;

Si: up to 1% by weight;

wherein a reminder of the function material is production-related contaminations in the form of at least one of Ni, Ca, P and S that are present in contents of <0.3% by weight each.

6. A combination of the layer-sintered valve seat ring according to claim 1 and a valve, wherein the valve is hard-faced or nitrided.

7. A combination of the layer-sintered valve seat ring according to claim 1 and a valve, wherein the valve is composed of a nickel-based alloy or an iron-based alloy with an Ni content of 10 to 40% by weight.

8. A combination of the layer-sintered valve seat ring according to claim 1 and a cylinder head of a cast iron alloy, wherein the cast iron alloy contains lamellar graphite, vermicular graphite or spheroidal graphite, and wherein the layer-sintered valve seat ring is inserted into the cylinder head with a press fit.

9. A method for producing a layer-sintered valve seat ring, comprising the steps:

producing starting material powders for a support material and a function material, the support material including:

C: 0.5 to 1.8% by weight

Cr: 3 to 16% by weight

Mo: 1 to 5% by weight

W: 0.5 to 5.5% by weight

V: 0.4 to 4.0% by weight

Cu: 12 to 25% by weight

Fe: 41.3 to 82.6% by weight

Mn: up to 0.6% by weight

Si: up to 1.8% by weight a remainder of production-related contamination in the form of at least one of Ni, Co, Ca, P, and S that are present in contents of <0.3% by weight each;

uniaxial pressing of the starting material powders;

sintering the uniaxially pressed starting material powders under an endogas atmosphere or a nitrogen-hydrogen atmosphere at a sintering temperature in the range ranging from 1055° C. to 1152° C.; and heat-treating the sintered material by tempering or annealing.

10. The method according to claim 9, wherein the uniaxial pressing is carried out at a pressure in the range from 40 MPa to 140 MPa, at a temperature ranging from 12° C. to 60° C. and for a time ranging from 0.5 s to 1.8 s.

11. The method according to claim 9, wherein the sintering is carried out at the sintering temperature for a time ranging from 10 min to 30 min.

12. The method according to claim 9, wherein the heat-treating is carried out by tempering.

13. The method according to claim 12, wherein the tempering is carried out by hardening at 850° C. to 950° C., oil-quenching and annealing at 510° C. to 610° C. in this order.

14. The method according to claim 9, wherein the heat-treating is carried out by annealing.

15. The method according to claim 14, wherein the annealing is carried out by heating at 550° C. to 620° C.

16. An internal combustion engine, that is partly or completely operated with hydrogen as fuel gas, comprising:

a valve; and a layer-sintered valve seat ring including at least two materials, the at least two materials including a function material for a tribological contact with the valve and a support material for the function material;

wherein the support material includes:

C: 0.5 to 1.8% by weight

Cr: 3 to 16% by weight

Mo: 1 to 5% by weight

W: 0.5 to 5.5% by weight

V: 0.4 to 4.0% by weight

Cu: 12 to 25% by weight

Fe: 41.3 to 82.6% by weight

Mn: up to 0.6% by weight

Si: up to 1.8% by weight a remainder of production-related contamination in the form of at least one of Ni, Co, Ca, P, and S that are present in contents of <0.3% by weight each.

17. The internal combustion engine according to claim 16, wherein the valve is hard-faced or nitride.

18. The internal combustion engine according to claim 16, wherein the valve is composed of a nickel-based alloy or an iron-based alloy with an Ni content of 10 to 40% by weight.

19. The internal combustion engine according to claim 16, wherein the function material includes:

C: 0.7 to 1.5% by weight;

Cr: 2 to 4% by weight;

Mo: 12 to 18% by weight;

W: 2 to 4% by weight;

V: 1 to 2% by weight;

Cu: 10 to 20% by weight;

Co: 6 to 14% by weight;

Fe: 34.5 to 66.3% by weight;

Mn: up to 1.0% by weight;

Si: up to 1% by weight; and a reminder of the function material is production-related contaminations in the form of at least one of Ni, Ca, P and S that are present in contents of <0.3% by weight each.

20. The internal combustion engine according to claim 16, wherein the support material contains:

C: 1.0 to 1.8% by weight;

Cr: 10 to 15% by weight;

Mo: 2.5 to 5% by weight;

W: 0.8 to 1.5% by weight;

Si: 0.2 to 1.8% by weight;

V: 0.4 to 1.5% by weight;

Cu: 12 to 25% by weight;

Fe: 47.8 to 73.1% by weight;

Mn: up to 0.6% by weight; and wherein the remainder are production-related contaminations in the form of at least one of Ni, Co, Ca, P and S that are present in contents of <0.3% by weight each.

* * * * *